United States Patent
Kister et al.

(10) Patent No.: US 7,162,513 B1
(45) Date of Patent: Jan. 9, 2007

(54) APPARATUS AND METHOD FOR DISTRIBUTING ELECTRONIC MESSAGES TO A WIRELESS DATA PROCESSING DEVICE USING A MULTI-TIERED QUEUING ARCHITECTURE

(75) Inventors: Scott Kister, Woodside, CA (US); Christopher Joseph DeSalvo, San Francisco, CA (US)

(73) Assignee: Danger, Inc., Palo Alto, CA (US)

( * ) Notice: Subject to any disclaimer, the term of this patent is extended or adjusted under 35 U.S.C. 154(b) by 844 days.

(21) Appl. No.: 10/236,255

(22) Filed: Sep. 5, 2002

Related U.S. Application Data

(63) Continuation-in-part of application No. 10/109,182, filed on Mar. 27, 2002.

(51) Int. Cl.
*G06F 15/16* (2006.01)

(52) U.S. Cl. .................. 709/206; 709/203
(58) Field of Classification Search ........... 709/206, 709/203, 207
See application file for complete search history.

(56) References Cited

U.S. PATENT DOCUMENTS

| | | | |
|---|---|---|---|
| 5,126,786 A | 6/1992 | Tanaka | |
| 5,159,592 A | 10/1992 | Perkins | |
| 5,436,960 A | 7/1995 | Campana, Jr. et al. | |
| 5,559,800 A | 9/1996 | Mousseau et al. | |
| 5,594,910 A | 1/1997 | Filepp et al. | |
| 5,625,670 A | 4/1997 | Campana, Jr. et al. | |
| 5,631,946 A | 5/1997 | Campana, Jr. et al. | |
| 5,715,387 A | 2/1998 | Barnstijin et al. | |
| 5,727,202 A | 3/1998 | Kucala | |
| 5,778,176 A | 7/1998 | Geihs et al. | |
| 5,790,974 A | 8/1998 | Tognazzini | |
| 5,802,312 A | 9/1998 | Lazaridis et al. | |
| 5,819,172 A | 10/1998 | Campana, Jr. et al. | |
| 5,915,095 A | 6/1999 | Miskowiec | |
| 5,961,590 A | 10/1999 | Mendez et al. | |
| 5,964,830 A | 10/1999 | Durrett | |
| 6,023,708 A | 2/2000 | Mendez et al. | |
| 6,035,104 A | 3/2000 | Zahariev | |
| 6,035,339 A | 3/2000 | Agraharam et al. | |
| 6,067,451 A | 5/2000 | Campana, Jr. et al. | |
| 6,076,109 A | 6/2000 | Kikinis | |
| 6,151,677 A | 11/2000 | Walter et al. | |
| 6,157,935 A | 12/2000 | Tran et al. | |
| 6,166,734 A | 12/2000 | Nahi et al. | |

(Continued)

FOREIGN PATENT DOCUMENTS

WO  WO 09/36344  8/1998

(Continued)

OTHER PUBLICATIONS

Meggers, J., et al., "A multimedia communicaiton archtecture for handhelf devices," Personal Indoor And Mobile Radio Communications, 1998. Sep. 8-11, 1998, IEEE, pp. 3 double-sided.

(Continued)

*Primary Examiner*—Krisna Lim
(74) *Attorney, Agent, or Firm*—Blakely, Sokoloff, Taylor & Zafman, LLP

(57) ABSTRACT

A system for distributing electronic messages to a wireless data processing device is described comprising: a dispatcher to maintain a communication channel with the wireless data processing device, the dispatcher comprising a short term message queue for temporarily storing e-mail messages addressed to the wireless data processing device while the dispatcher attempts to transmit the e-mail messages to the wireless data processing device; and a long term message queue for receiving the e-mail messages from the dispatcher if the dispatcher is unable to deliver the e-mail messages to the wireless data processing device after a specified period of time or a specified number of attempts.

24 Claims, 9 Drawing Sheets

U.S. PATENT DOCUMENTS

| | | | |
|---|---|---|---|
| 6,167,441 | A | 12/2000 | Himmel |
| 6,199,099 | B1 | 3/2001 | Gershman et al. |
| 6,233,318 | B1 * | 5/2001 | Picard et al. ............. 379/88.17 |
| 6,289,212 | B1 * | 9/2001 | Stein et al. ............... 455/412.1 |
| 6,317,592 | B1 * | 11/2001 | Campana et al. ........ 455/412.1 |
| 6,330,618 | B1 | 12/2001 | Hawkins et al. |
| 6,370,687 | B1 | 4/2002 | Shimura |
| 6,396,482 | B1 | 5/2002 | Griffin et al. |
| 6,418,310 | B1 | 7/2002 | Dent |
| 6,622,175 | B1 | 9/2003 | Piller |
| 2001/0056508 | A1 | 12/2001 | Ameson et al. |
| 2002/0083035 | A1 * | 6/2002 | Pearl et al. ..................... 707/1 |
| 2002/0103935 | A1 * | 8/2002 | Fishman et al. ............. 709/246 |
| 2002/0132609 | A1 * | 9/2002 | Lewis et al. ................. 455/412 |
| 2002/0194279 | A1 * | 12/2002 | Chern ......................... 709/206 |
| 2003/0055902 | A1 * | 3/2003 | Amir et al. .................. 709/206 |
| 2003/0081591 | A1 * | 5/2003 | Cheung et al. .............. 370/352 |
| 2003/0088693 | A1 * | 5/2003 | Cheung et al. .............. 709/238 |
| 2003/0115270 | A1 * | 6/2003 | Funk et al. .................. 709/206 |
| 2003/0182380 | A1 * | 9/2003 | Yabe et al. .................. 709/206 |
| 2004/0199663 | A1 * | 10/2004 | Horvitz et al. .............. 709/238 |

FOREIGN PATENT DOCUMENTS

| | | |
|---|---|---|
| WO | WO 99/06929 | 2/1999 |
| WO | WO 00/30003 | 5/2000 |

OTHER PUBLICATIONS

Bergzen H, "Project Status And System Archteichtrue Of An Automated HF System To Be Used By The Swedish Armed Forces," Oct. 28, 2001 IEEE Military Commuinications Conference, pp. 4 doublesided.

Henderson, R. C., et al., "A Taxonomy of Network Transcoding" Proceedings of the SPIE, vol. 3969, Jan. 24, 2000, pp. 65-72, XP008007261, ISSN: 0277-786X.

Fox, A., et al., "Adapting To Network And Client Variability Via On-Demand Dynamic Distillation" ACM Sigplan Notices, Association for Computing Machinery, vol. 31, No. 9, Sep. 1, 1996, pp. 160-170, XP000639230, ISSN: 0362-1340.

Mohan, R., et al., "Content Adaptation Framework: Bringing the Internet To Information Appliances" 1999 IEEE Global Telecommunications Conference Globecom 1999, Seamless Interconnection For Universal Services, vol. 4, Dec. 5, 1999, pp. 2015-2021, XP000951336, ISBN: 0-7803-5797-3.

Abrams, M., et al., "UIML: An Appliance-Independent XML User Interface Language" Proceedings of the International Conference On World Wide Web, May 11, 1999, pp. 1-14, XP002163485.

"CC/PP Attribute Vocabularies" W3C Jul. 21, 2000, XP002218349.

Excite Home Page, http://www.excite.com/, 1 page Aug. 1, 2000.

Yahoo Home page, http://www.yahoo.com/, 1 page Aug. 1, 2000.

Alta Vista Home Page, http://www.altavista.com/, 1 Page Aug. 1, 2000.

Anita Komlodi, Key Frame Preview Techniques For Video Browsing, Digital Library Research Group, College of Library and Information Services University of Maryland, pp. 118.

Appenzeller, et al.., "User-friendly Access Control For Public Network Ports", IEEE, pp. 699-707, Mar. 1999.

* cited by examiner

Internal to External Message ID Mapping

| Internal Server (IMAP) Message ID Codes | External Server (POP) Message ID Codes |
|---|---|
| Folder=inbox, uid = 3361 | B88143177 6693cca7e41ccded0f56610 (msg no 1) |
| Folder=inbox, uid = 3362 | B88143177 6693cca7e41ccded0f56611 (msg no 2) |
| Folder=inbox, uid = 3363 | B88143177 6693cca7e41ccded0f56612 (msg no 3) |
| Folder=saved mail, uid = 3361 | B88143177 6693cca7e41ccded0f56613 (msg no 4) |
| Folder=saved mail, uid = 3362 | B88143177 6693cca7e41ccded0f56614 (msg no 5) |
| Folder=inbox, uid = 3364 | B88143177 6693cca7e41ccded0f56615 (msg no 6) |
| Folder=inbox, uid = 3365 | B88143177 6693cca7e41ccded0f56616 (msg no 7) |

*Fig. 3*

GID to Standard IMAP ID Code Mapping

| GID Codes | Standard IMAP ID Codes |
|---|---|
| 0000000001 | Folder=inbox, uid = 3361 |
| 0000000002 | Folder=inbox, uid = 3362 |
| 0000000003 | Folder=inbox, uid = 3363 |
| 0000000004 | Folder=saved mail, uid = 3361 |
| 0000000005 | Folder=saved mail, uid = 3362 |
| 0000000006 | Folder=inbox, uid = 3364 |
| 0000000007 | Folder=inbox, uid = 3365 |

*Fig. 5*

| User ID Code | Device ID Code | User Name | Online Status | SIM IDs |
|---|---|---|---|---|
| 660098373 | 8879987283 | ScottKister | Offline | 1231234 1232389 |
| 609382728 | 8897728736 | ChristopherDesalvo | Online Dispatcher 615 | 3379817 |
| 682729873 | 8892273827 | TomWebster | Offline | 2231212 |
| --- | --- | --- | --- | --- |

APPARATUS AND METHOD FOR DISTRIBUTING ELECTRONIC MESSAGES TO A WIRELESS DATA PROCESSING DEVICE USING A MULTI-TIERED QUEUING ARCHITECTURE

CLAIM OF PRIORITY

This application is a continuation-in-part of U.S. patent application Ser. No. 10/109,182 granted a filing date on Mar. 27, 2002 and entitled "Apparatus and Method For Coordinating Multiple E-mail Accounts".

BACKGROUND OF THE INVENTION

1. Field of the Invention

This invention relates generally to the field of data processing systems. More particularly, the invention relates to an improved architecture for distributing electronic messages to a wireless data processing device.

2. Description of the Related Art

E-mail has become an irreplaceable tool in today's business environment. Virtually all corporate employees rely on e-mail in one way or another to communicate both externally with customers and internally with other employees. In addition, most e-mail users have at least one personal e-mail account. The personal e-mail account may be provided by the user's Internet Service Provider (e.g., Pacific Bell, AT&T Worldnet,™ America Online,™ . . . etc), or by an Internet Web site (e.g., Yahoo™ Mail or Hotmail™).

One problem which exists with this scenario is that users may find it difficult to coordinate among a plurality of different e-mail accounts. For example, while a user may check his/her corporate e-mail account throughout the day while at work, the user may not remember to, or may not be able to, check his/her personal e-mail account. Similarly, while at home in the evening or on weekends, the user may only have access to his/her personal e-mail account. Thus, if the user sends an e-mail from his/her personal account to a business associate, the user may not be able to review the business associate's reply until the user returns home and logs in to his/her personal e-mail account. Conversely, if the user sends an e-mail from his/her corporate account to a friend, the user may not be able to access the friend's reply until the user returns to work and logs in to his/her personal e-mail account. Even if a user is able to access both e-mail accounts from the same location, requiring the user to log into two or more different e-mail systems is somewhat burdensome, particularly when two or more different user agents may be required on the user's desktop computer and/or wireless client (e.g., Microsoft Outlook™ and Lotus Notes™).

The foregoing problem is further exacerbated by the fact that many e-mail systems work with different, incompatible e-mail standards. The two most common e-mail standards are the Post Office Protocol 3 ("POP3") and the Internet Messaging Access Protocol ("IMAP").

POP3 is commonly used for Internet e-mail accounts. A POP3 server temporarily stores incoming e-mail messages until they are downloaded by a logged in user. The user may configure the server to either delete the e-mail messages as soon as they are downloaded or wait until the user indicates that they should be deleted. POP3 is a relatively simple protocol with limited configurable options. All pending messages and attachments are downloaded from a single e-mail folder on the server to a single e-mail folder on the user's client computer or wireless device (i.e., the user agent's "Inbox"). Messages are identified based on a unique message identification code.

IMAP is another common, and somewhat more sophisticated, e-mail standard which is widely used for both Internet e-mail accounts and corporate e-mail accounts. IMAP4 is the latest version. Unlike POP3, it provides a message database in which messages can be archived in folders (e.g., inbox, sent mail, saved mail, . . . etc) and e-mailboxes that can be shared between users. IMAP also provides improved integration with Multipurpose Internet Mail Extensions ("MIME"), the protocol used to attach files to e-mail messages (e.g., users can read only message headers without having to automatically accept and wait for the attached files to download).

SUMMARY

A system for distributing electronic messages to a wireless data processing device is described comprising: a dispatcher to maintain a communication channel with the wireless data processing device, the dispatcher comprising a short term message queue for temporarily storing e-mail messages addressed to the wireless data processing device while the dispatcher attempts to transmit the e-mail messages to the wireless data processing device; and a long term message queue for receiving the e-mail messages from the dispatcher if the dispatcher is unable to deliver the e-mail messages to the wireless data processing device after a specified period of time or a specified number of attempts.

BRIEF DESCRIPTION OF THE DRAWINGS

A better understanding of the present invention can be obtained from the following detailed description in conjunction with the following drawings, in which:

FIG. 3 illustrates a mapping of internal account codes with external account codes according to one embodiment of the invention.

FIG. 5 illustrates a mapping of global identification codes ("GIDs") to standard IMAP identification codes according to one embodiment of the invention.

FIG. 7 illustrates a set of user data maintained within a user database according to one embodiment of the invention.

DETAILED DESCRIPTION OF PREFERRED EMBODIMENTS

Described below is a system and method for coordinating between a plurality of e-mail accounts. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Figure 1:
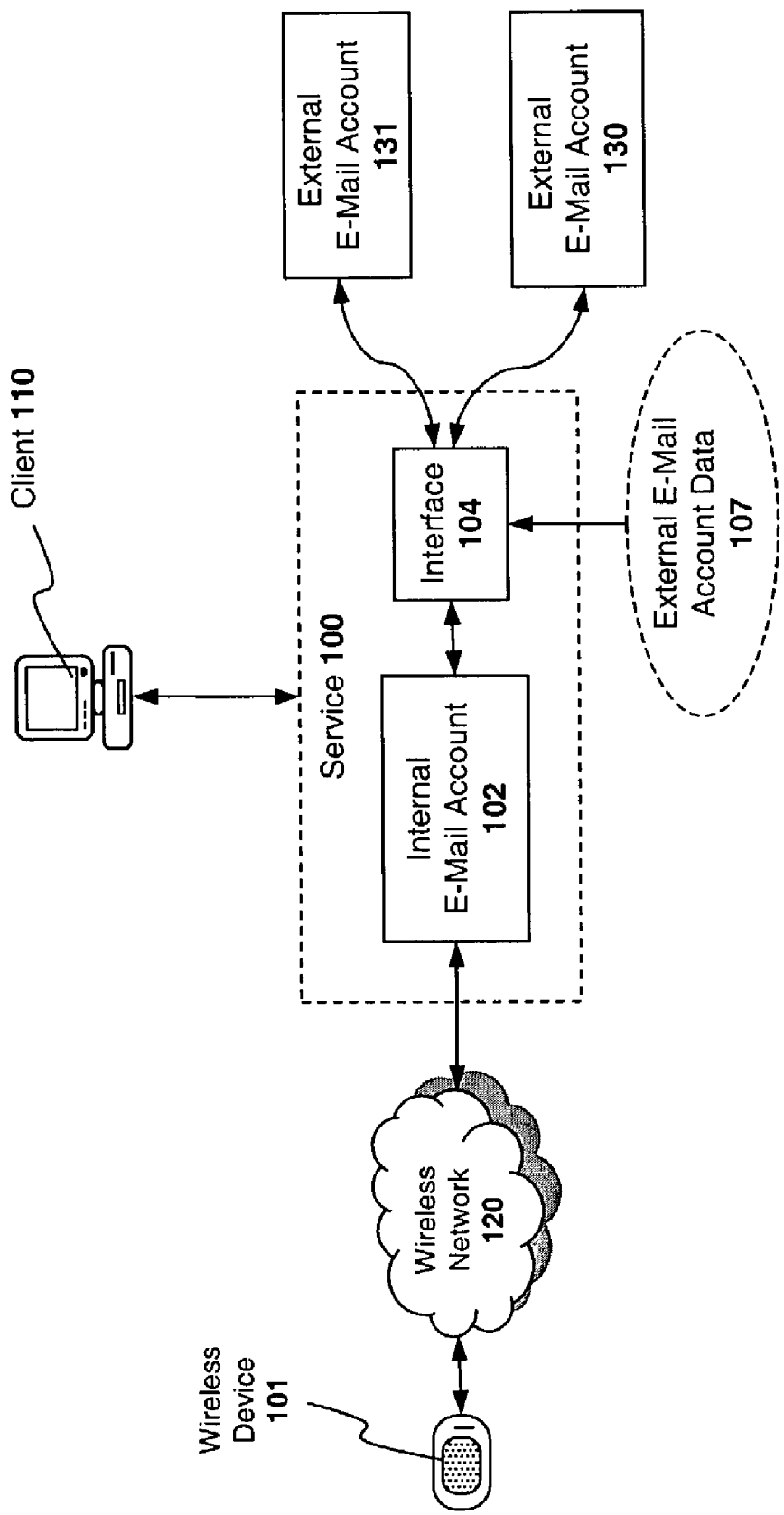
FIG. 1 illustrates an e-mail system architecture according to one embodiment of the invention.

Embodiments of the invention may be implemented on a data processing service 100 such as that illustrated generally in FIG. 1. In one embodiment, the service 100 acts as a proxy between a wireless data processing device 101 and any external servers with which the wireless device 101 communicates such as, for example, e-mail servers 130 and 131 and Web servers (not shown). For example, standard applications, multimedia content and data may be converted by the service 100 into a format which the wireless device 101 can properly interpret. One embodiment of a service 100 is described in co-pending application entitled NETWORK PORTAL SYSTEM, APPARATUS AND METHOD, Ser. No. 09/714,897, Filed Nov. 15, 2000 (hereinafter "Network Portal Application"), which is assigned to the assignee of the present application and which is incorporated herein by reference.

According to the embodiment illustrated in FIG. 1, a user is provided with an internal e-mail account 102 on the service 100 (e.g., maintained on one or more e-mail servers). As used herein, "internal" refers to the fact that the e-mail account is maintained and controlled by the service 100. The user may access the internal e-mail account 102 to send and receive e-mail messages from the user's wireless device 101 over a wireless network 120 and/or from a client computer 110 (e.g., a personal computer communicatively coupled to the Internet). Various network types may be employed including, for example, those that support Cellular Digital Packet Data ("CDPD") and Mobitex. It should be noted, however, that the underlying principles of the invention are not limited to any particular type of wireless network 120.

In addition to the internal e-mail account 102, the user may have various "external" e-mail accounts 130 and 131, i.e., "external" in the sense that they are not maintained or controlled directly by the service 100. As described above, in prior systems, the user would typically be required to log in separately to each of the individual e-mail accounts 102, 130 and 131. By contrast, in one embodiment of the invention, the service 100 automatically retrieves messages from the user's external accounts 130 and 131 and store the messages within the user's internal e-mail account 102. Thus, the user may access all of his/her messages from a single account 102 and using a single user agent.

In the embodiment illustrated in FIG. 1, an interface 104 configured on the service 100 periodically queries the external e-mail accounts 130 and 131 to check for new messages. Alternatively, or in addition, the interface 104 may retrieve messages from the external accounts 130 and 131 only after receiving a command from the user, or each time the user logs in to the internal e-mail account 102. In one embodiment, the user may configure the external e-mail accounts 130, 131 to automatically transmit new e-mail messages to the interface 104 as they are received.

Before the interface 104 can retrieve messages from the external e-mail accounts 130, 131, it must initially be programmed with the network addresses of the servers for each account (e.g., mail.pacbell.net) and valid user authentication data. For example, the external e-mail accounts 130, 131 will typically require a valid user name and password before providing e-mail messages to the interface 104. Accordingly, as indicated in FIG. 1, the user may initially be required to provide the interface with external e-mail account data 107.

Once e-mail messages from the external e-mail accounts 130, 131 have been stored within the internal e-mail account 102, the user may perform various e-mail operations on them (e.g., reply to, delete, move to saved mail folder, . . . etc) just as if they were initially addressed to the internal account 102. In addition, in one embodiment, the interface 104 will transmit mail account updates to the external e-mail accounts 130, 131. For example, when a user deletes a particular message, an indication that the message was deleted will be transmitted to the external accounts 130, 131, thereby maintaining message consistency among the various e-mail accounts. In one embodiment, the choice as to whether operations on internal accounts 102 should be reflected on external accounts 130, 131, may be made by the user on an account-by-account basis.

Figure 2:
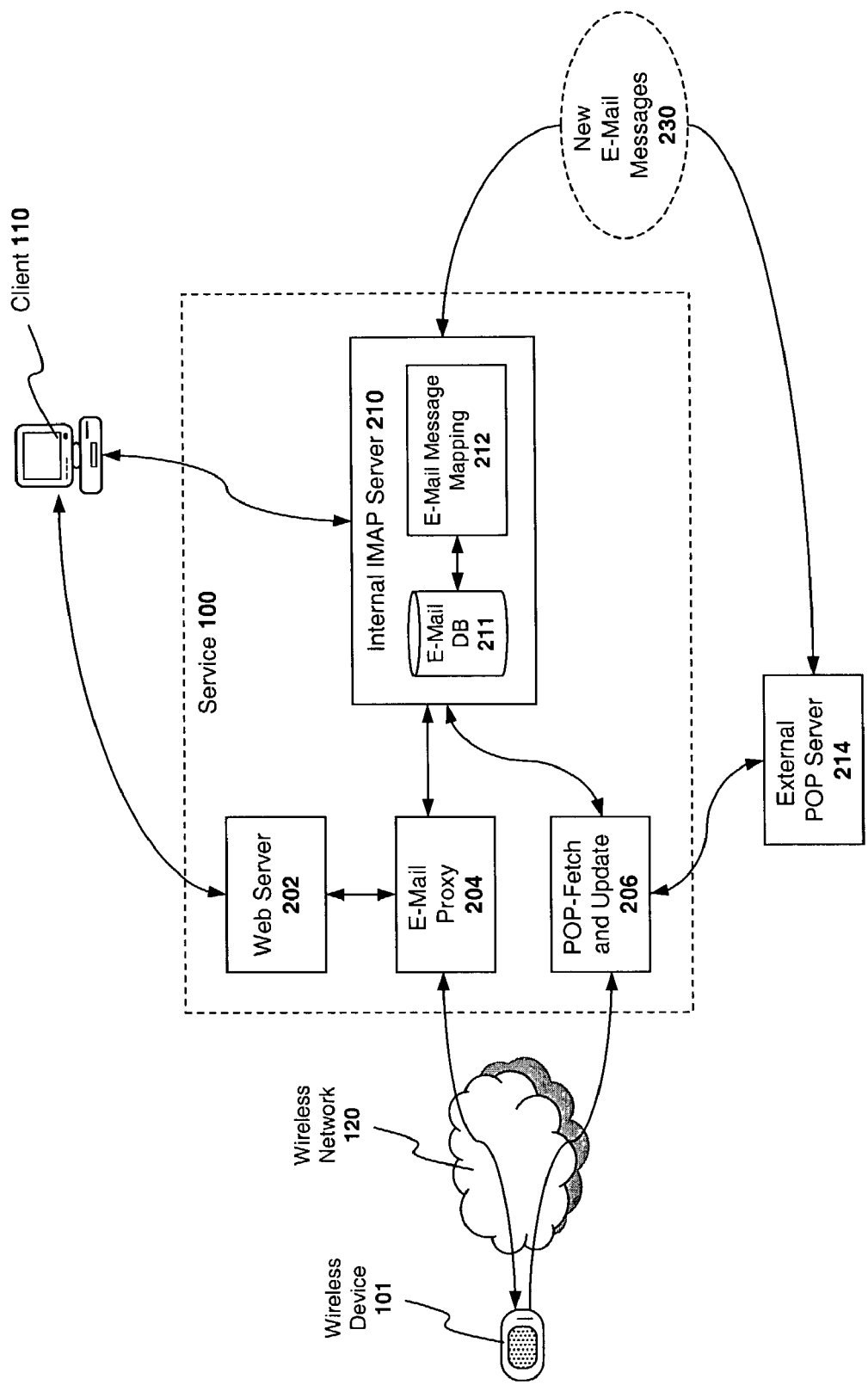
FIG. 2 illustrates a more specific embodiment of the invention which includes an internal IMAP account and an external POP account.

One particular embodiment for coordinating e-mail messages between an internal e-mail account which employs the IMAP protocol (e.g., IMAP4) and an external account which employs the POP3 protocol is illustrated in FIG. 2. Although this embodiment will be described with reference to these two particular protocols, it should be noted that the underlying principles of the invention may be implemented using a variety of alternate messaging protocols (e.g., the Distributed Mail System Protocol ("DMSP"), X.400, . . . etc).

In this embodiment, a POP Fetch/Update interface 206 is configured on the service 100 to fetch e-mail messages from one or more external POP servers 214. As described above, the POP Fetch/Update interface 206 may be programmed to periodically (e.g., every 15 minutes) check for new e-mail messages 230 on the external POP account 214. In addition, the user may command the POP Fetch/Update interface 206 to check for new messages at any given time, from either the wireless device 101 or the client computer 110.

Regardless of how the POP Fetch/Update interface 206 is triggered to check for new messages, once it is, it will initially transmit authentication data to the external POP account 214 such as, for example, the user's e-mail account name and password. Once the authentication data is accepted by the external POP account 214, the POP account 214 transmits any new e-mail messages to the POP Fetch/Update interface 206. In one embodiment, the POP protocol is used to transmit files from the POP account 214 to the POP Fetch/Update interface 206. However, the underlying principles of the invention are not limited to any message transmission protocol.

Depending on how the user's external POP account is configured, the messages transmitted to the POP Fetch/Update interface 206 may either be automatically deleted from the external account 214 as soon as they are transmitted, or maintained on the external account 214 until the user subsequently indicates that the messages should be deleted.

In one embodiment, the POP Fetch/Update interface 206 transfers the new e-mail messages to a specified folder on the internal IMAP account 210. For example, if the user has a Yahoo e-mail account and a Worldnet e-mail account, the user may set up two independent folders on the internal IMAP account 210 (e.g., "Yahoo Mail" and "Worldnet Mail," respectively) to store new e-mail messages from both accounts (as mentioned above, IMAP provides support for e-mail message folders).

If the external POP account 214 is configured to store e-mail messages even after the messages have been retrieved, then two copies of each message will exist following retrieval: one copy on the external account 214 and one copy on the internal e-mail database 211. As such, to provide for greater coordination between the two accounts, in one embodiment, e-mail message mapping logic 212 generates a link between the messages stored on the internal account 210 and the external account 214. For example, a table such as the one illustrated in FIG. 3 may be generated by the e-mail message mapping logic 212 to map internal e-mail message identification codes 301 with external e-mail message identification codes 302. In operation, each time the user performs an operation with respect to a particular internal e-mail message, the e-mail message mapping logic 212 will determine whether a corresponding external e-mail message exists. If so, it will notify the POP Fetch/Update interface 206, which will subsequently update the external POP account 214 accordingly.

For example, referring again to FIG. 3, if the user deletes a message with internal message ID code "folder=saved mail, uid=3361," the e-mail message mapping logic 212 will indicate to the POP Fetch/Update interface 206 that external message number 4, with external message ID code "B881431776693cca7e41ccded 0f56613" should be deleted from the external POP server 214. The POP Fetch/Update interface 206 will then transmit a POP3 "delete" command to the external POP account 214, identifying the message using the message number (e.g., "DELE 4"). In this way, the user can effectively manage several different mail accounts from a single account.

The user may access the internal e-mail account 210 from his/her wireless device 101 which, in one embodiment, connects to the account via an e-mail proxy 204. As described in the Network Portal Application, in one embodiment, the e-mail proxy 204 uniquely formats e-mail messages and other content (e.g., Web pages, graphical images, etc) based on the capabilities of the particular wireless device 101. The user may also access the internal e-mail account 210 via a client desktop or notebook computer 110, either directly or through a Web interface 202 (e.g., such as the Web interfaces provided by Yahoo Mail and Hotmail).

Figure 4:
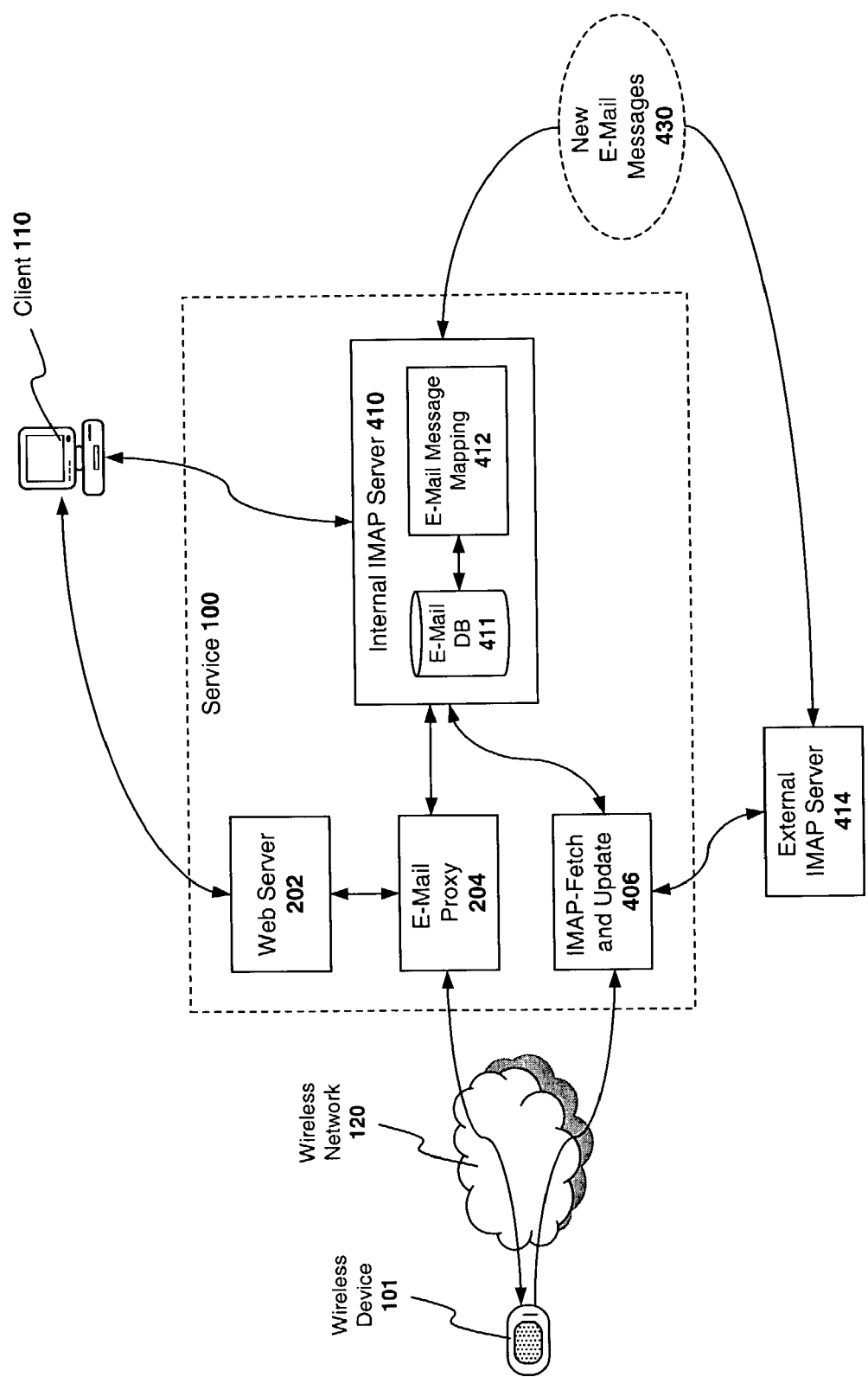
FIG. 4 illustrates one embodiment of an e-mail system in which both the internal and external account are IMAP accounts.

FIG. 4 illustrates an embodiment in which both the internal e-mail account 410 and the external e-mail account 414 are IMAP accounts. Because the external IMAP account 414 will have support for e-mail folders, various levels of e-mail coordination are possible. For example, the user may configure the IMAP Fetch/Update Interface 406 to retrieve messages only found in specified folders on the external e-mail account 414 (e.g., just from the "inbox" folder). Once specific folders have been identified by the user, the internal account 410 may retrieve messages from the external account 414 in a similar manner as described above. For example, once the messages are retrieved from the external account 414, e-mail message mapping logic 412 executed within the internal account 410 will associate each external message ID code with an internal message ID code (e.g., as illustrated generally in FIG. 3). The association may then be used to transmit message updates to the remote account 414. For example, when the user deletes a message, the e-mail message mapping logic 412 will determine if a corresponding external message exists (e.g., by performing a table lookup using the internal message ID code). If so, the e-mail message mapping logic 412 will transmit the external ID code to the IMAP Fetch/Update Interface 406 which will subsequently transmit a "delete" command to the external IMAP account 414 (i.e., identifying the message to be deleted by the external ID code).

One additional problem when working with internal and/or external IMAP accounts is that e-mail message ID codes are only unique within each individual IMAP folder. For example, both the "inbox" folder and the "saved mail" folder may contain e-mail messages with ID codes ranging from 1 through 20 (i.e., the same ID codes are used for different e-mail messages). In addition, when an e-mail message is moved from a source folder to a destination folder, it is provided with a new ID code (i.e., based on the ID codes used for messages already stored in the folder). As a result, some mechanism must be provided in order to maintain an accurate mapping between messages stored on the internal e-mail account 210, 410 and the external e-mail account 214, 414.

In one embodiment of the invention, in order to accurately track messages across IMAP folders, a unique global ID code ("GID") is generated for all messages on the IMAP account 210, 410. Unlike standard IMAP identification codes, a message's GID uniquely identifies that message on the account 210, 410, and will not change as the message is moved from one folder to the next. The table in FIG. 5 sets forth an exemplary mapping of GIDs to standard IMAP ID codes. In one embodiment, the e-mail message mapping logic 212, 412 associates each e-mail message's GID with a corresponding ID code on the remote account. As a result, when a user moves a file from one folder to another at the internal account 210, 410, the corresponding message on the external account 214, 414 may still be identified.

GIDs may be generated and maintained in several different ways. In one embodiment, whenever an update to a particular message is made, the GID mapping is updated. For example if GID=20 corresponds to INBOX:25 and the user moves INBOX:25 to Trash:12, the mapping us updated accordingly. One advantage of this technique is that it enables quick lookups of messages by GIDs.

In another embodiment, an X-Header such as X-GID:20 is inserted into the actual header of the mail message. If the message is moved, the header moves with it. One advantage of this technique is that less work is required to track the message from one folder to the next.

In one embodiment, when a user responds to an e-mail message from the internal account 210, 410, the "FROM:" field in the header will indicate the original account to which the message was transmitted. For example, if the message was originally sent to the external account 214, 414, then the "FROM:" field will include the external account address, notwithstanding the fact that the reply is generated at the internal account.

In addition, an indication that the message was transmitted from the internal account may also be included in the message. For example, when the message is transmitted from the wireless device an indication that the message was send from a "Wireless" device may be appended to the sender's name (e.g., "Scott Kister (wireless)" scott.kister@danger.com), thereby identifying the true origin of the message while, at the same time, maintaining the original e-mail recipient address. In one embodiment, this indication may be enabled or disabled at the internal account 210, 410 by the end user.

Figure 6:
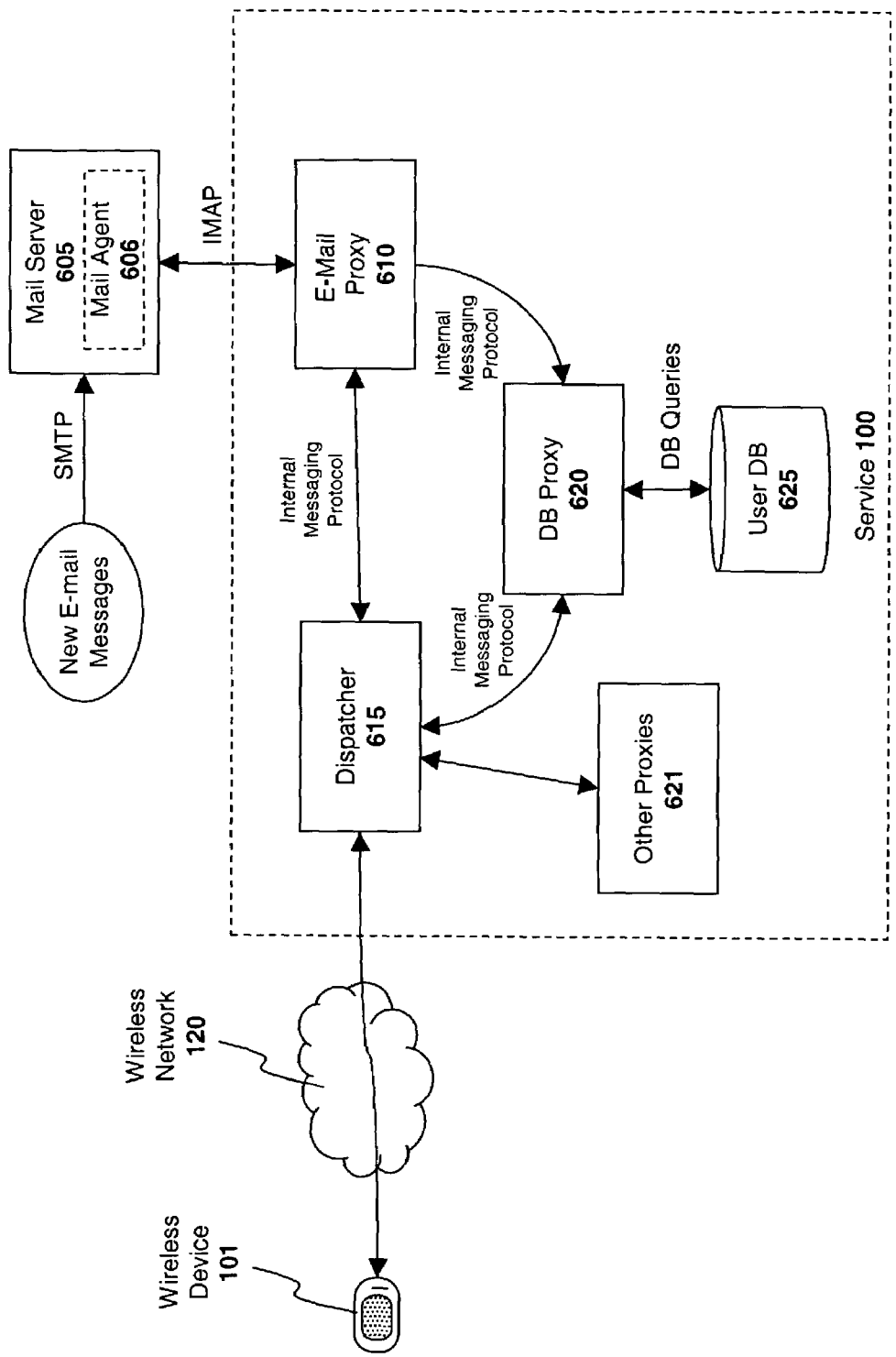
FIG. 6 illustrates one embodiment of an improved system for distributing electronic messages to a data processing device.

FIG. 6 illustrates another embodiment of an email system for distributing electronic messages to a wireless data processing device 101. This embodiment is comprised generally of a user database 625, a database proxy server 620 for accessing the user database 625, an e-mail proxy server 610, a dispatcher server 615 and a mail agent 606 executed on a mail server 605 (or, alternatively, on a separate server).

An exemplary portion of the user database 625 illustrated in FIG. 7 contains a mapping of user identification codes 701 to data processing device identification codes 702. The user ID/device ID mapping is used by the service 100 to identify the particular wireless device 101 to which e-mail messages and other data should be transmitted for a given user. In addition, the user database 625 contains the user's account name, the user's online status, including the particular dispatcher 615 through which the wireless device 101 is communicating, and the Subscriber Identity Module ("SIM") identification codes associated with the user (the user may maintain more than one SIM).

The dispatcher 615 forms the central point of communications for data transmitted between the wireless device 101 and the service 100. In one embodiment, the dispatcher 615 maintains socket connections (e.g., TCP sockets) between the wireless device 101 and the various proxy servers maintained on the service 100. For example, for an e-mail session, the dispatcher 615 opens and maintains a socket connection between the wireless device 101 and the e-mail proxy server 610. Similarly, for other wireless applications (e.g., instant messaging, Web browsing, . . . etc) the dispatcher 615 establishes and maintains socket connections between the wireless device 101 the appropriate proxy server 621 (e.g., an instant messaging proxy server, a Web proxy server, . . . etc). Each time a user logs in or out of the service 100, the dispatcher 615 notifies the DB proxy 620 to update the user's online status within the user database 625 accordingly. In addition, given the significant differences in bandwidth between the wireless network 120 and the local network on which the service 100 operates, the dispatcher 615 temporarily buffers data transmitted to and from the wireless device 101 over each individual socket connection.

The mail agent 606 executed on the mail server 605 (or on a separate server) continually tracks changes to the user's e-mail account. In one embodiment, the agent 606 periodically checks the user's inbox to determine whether the user has received any new e-mail messages. When a new e-mail message addressed to the user arrives, the mail agent 606 transmits a "new e-mail message" alert to the e-mail proxy server 610. The e-mail proxy server 610 forwards the new e-mail message alert to the DB proxy server 620. The e-mail proxy server may convert the format of the new e-mail message alert from a standard format (e.g., IMAP) to a proprietary messaging format employed by the service 100.

The DB proxy server 620 queries the user database 625 to determine whether the user is online or offline, and, if online, which dispatcher 615 the wireless data processing device 101 is connected through. The DB proxy server 620 then automatically transmits the new e-mail message alert to the user's wireless device 101 via the dispatcher 615. Thus, if the user is online, he/she receives an automatic indication when any new e-mail messages arrive at his/her e-mail account.

Figure 8:
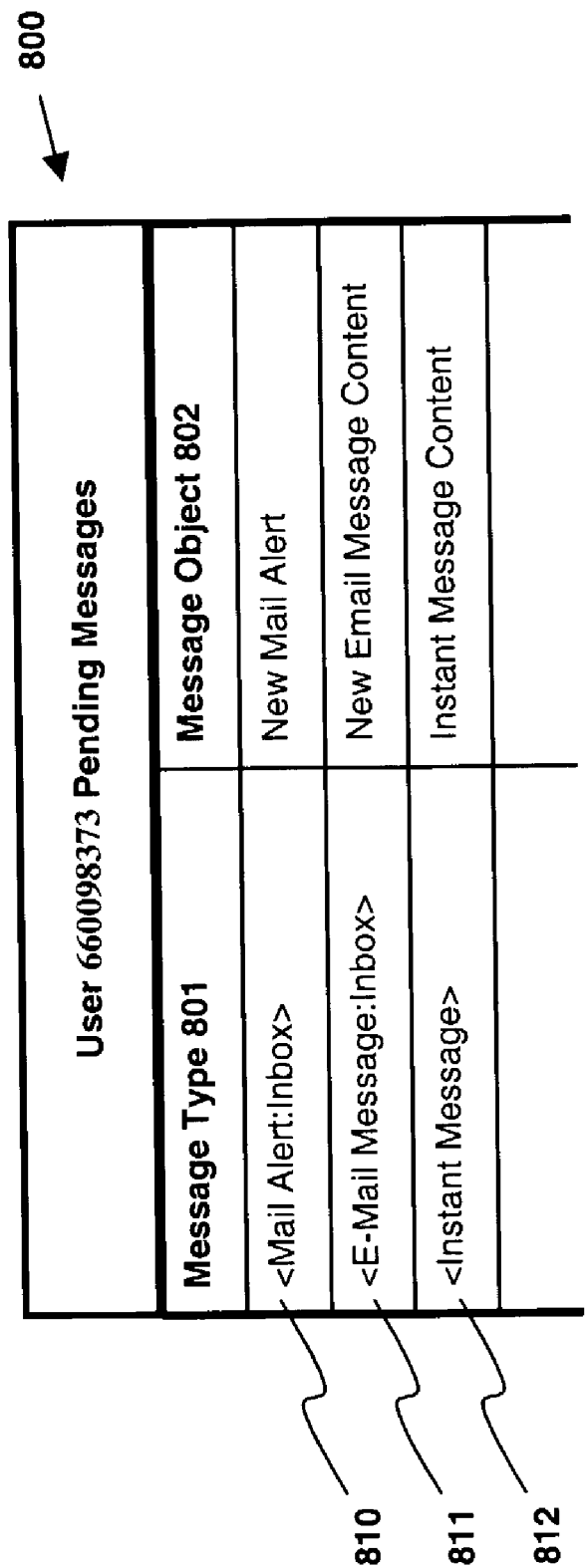
FIG. 8 illustrates a pending message table employed in one embodiment of the invention.

If, however, the user is offline, then the DB proxy 620 stores the new e-mail alert in a pending message table 800 such as that shown in FIG. 8. The pending message table is comprised of a message type indication 801, indicating the type of data stored in the table, and a message object 802 which contains the underlying message data. Three types of message types are illustrated in FIG. 8: a new e-mail message alert 801, a new e-mail message 811, and a new instant message 812. Of course, a virtually unlimited number of message types may be temporarily queued within on the user database 625 while still complying with the underlying principles of the invention.

In one embodiment, once a new e-mail message alert is stored in the user's pending message table 800 for a particular mail folder (e.g., the user's Inbox on a particular mail server), no additional alerts or e-mail messages are stored in the table for that mail folder, thereby conserving network bandwidth and storage space on the user database 625. If a new e-mail alert for a different folder is received, however, then the new e-mail alert is stored in the pending message table 800.

Whenever a user re-connects to the service 100 through a dispatcher 615, the dispatcher 615 initially checks the DB proxy 620 to determine whether any e-mail message alerts, e-mail messages or other types of data are pending for the wireless device 101. If so, then the dispatcher 615 retrieves them via the DB proxy 620 and transmits them to the wireless device 101.

In one embodiment, once the wireless device 101 receives the new e-mail message alert 810 (either immediately, or after it is queued in the user database), the wireless device 101 transmits a request for all new e-mail messages above a specified global ID value. The request may be generated automatically by the device 101 or manually, in response to a user command. As indicated in FIG. 5 new global ID's are assigned sequentially as new e-mail messages are received by the service 100. Accordingly, the wireless device 101 may query it's local e-mail storage to identify the maximum GID value for a previously-downloaded e-mail message, and then request all e-mail messages with GID values higher than the identified GID value. Transmitting a bulk request for all new e-mail messages in this manner saves a significant amount of network bandwidth when compared with the technique of requesting each new e-mail message individually.

The dispatcher 615 identifies the bulk request as an e-mail request (e.g., by reading the header of the data object associated with the request) and responsively forwards the request to the e-mail proxy 610. As mentioned above, if the request had been a Web page request or an instant messaging transaction, the dispatcher would forward the request to a Web proxy server or an instant messaging proxy server, respectively.

The e-mail proxy 610 decodes the request and responsively translates the request to the IMAP protocol (or other protocol employed by the mail server 605). For example, in response to the single request for "all new e-mail messages" the proxy server 610 may request each new e-mail message individually and then bundle them into a single, bulk e-mail message response to the data processing device 101, again conserving network bandwidth.

In one embodiment, the proxy server 610 initially requests a list of all new e-mail message headers as opposed to the entire contents of each e-mail message (i.e., e-mail header+body). Once the message headers are received at the data processing device 101, the user may review the subject line of each message from the message header and download only those the e-mail messages which he/she wishes to read.

The wireless network 120 is not typically as reliable as a wired network. As such, the wireless device 101 may occasionally become disconnected from the wireless network 120 during the middle of a data transaction with the service 100. For example, the wireless device 101 may move out of contact with the wireless network after the e-mail proxy 610 has retrieved one or more e-mail messages from the e-mail server 605 on behalf of the user but before the requested e-mail messages have been successfully delivered to the wireless device 101 by the dispatcher 615. If this occurs, in one embodiment, the dispatcher 615 temporarily queues the e-mail messages (or other data) in memory until the wireless device 101 comes back online. Once the wireless device 101 reestablishes a connection with the dispatcher 615, the dispatcher 615 transmits the queued data to the wireless device 101.

In one embodiment, however, if the user has been out of contact for some predetermined period of time (e.g., 5 minutes), the dispatcher 615 transmits the queued data to the DB proxy 620, which then stores the data within a pending message table 800, as described above. Alternatively, or in addition, the dispatcher 615 may transmit the queued data to the DB proxy 620 after making a specified number of attempts to transmit the data to the wireless device 101 (i.e., rather than a specified amount of time).

When the user reestablishes a connection with the service 100, the dispatcher 615 (which may be a different dispatcher than the one that initially queued the data) queries the DB proxy 620 for any pending data. The DB proxy 620 then transmits the pending data to the dispatcher 615 which forwards the data to the wireless device 101.

Thus, the service 100 provides a reliable delivery system for e-mail messages and other data using multiple levels of queuing. The dispatcher 615 acts as a short-term queue, storing e-mail messages for a specified period of time. If the wireless device 101 is still offline after the specified period of time, the dispatcher 615 forwards the pending e-mail messages to a user database 625 maintained by the DB proxy 620, thereby freeing up memory and processing power which the dispatcher 615 can reallocate to other data processing device connections. The e-mail messages and other data are then stored in the user database 625 indefinitely (i.e., until the wireless device 101 comes back online).

Figure 9:
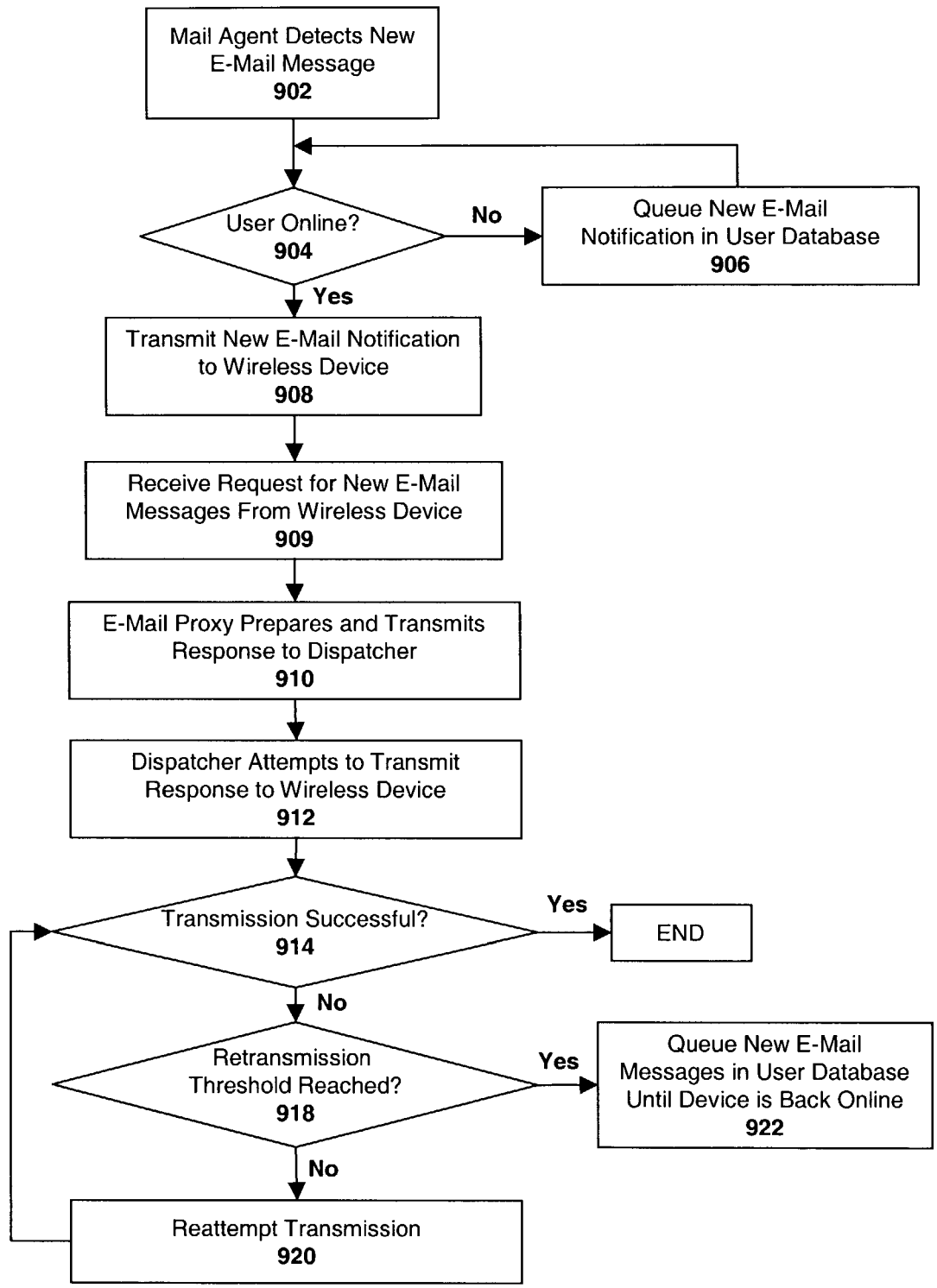
FIG. 9 illustrates a process according to one embodiment of the invention.

FIG. 9 is a flowchart which outlines various aspects of the e-mail delivery process just described. At 902 the mail agent 606 detects that new e-mail messages have arrived in the user's inbox on the mail server 605. At 904, the DB proxy 620 determines whether the wireless device 101 is currently online via a query to the user database 625. If not, the new e-mail notification is queued within the user database 906 and subsequently transmitted to the wireless device 101 the next time it connects to the service 100.

If the wireless device 101 is online, then at 908 the dispatcher transmits the new e-mail notification to the wireless device 101. At 909, the e-mail proxy 610 receives a request for all new e-mail messages from the wireless device 101 (e.g., above some specified GID value). At 910, the e-mail proxy retrieves, reformats and transmits the new e-mail messages (e.g., by bundling them in a single response) to the dispatcher and at 912 the dispatcher 615 attempts to transmit the e-mail messages to the wireless device.

If the transmission is successful, determined at 914, then the process ends. If, however, the transmission is unsuccessful, then the dispatcher 615 will continue to attempt to transmit the e-mail messages from it's local message queue, at 920, as long as a retransmission threshold condition has not been reached, determined at 918 (e.g., a time threshold or retransmission attempt threshold has not passed). If the retransmission threshold has been reached, then at 922, the e-mail messages are transmitted from the dispatcher queue to a long term pending message queue (e.g., the pending message table 800) within the user database 625.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although each of the functional modules illustrated in FIG. 6 is described herein as a separate "server," it will be readily apparent to those of skill in the art that the functional modules may be grouped within a single server or spread across multiple servers while still complying with the underlying principles of the invention. Moreover, the mail server 605 may be maintained within the service 100 rather than external to it, as illustrated. In addition, while embodiments of the invention are described above in the context of IMAP and POP, the underlying principles of the invention may be employed using a variety of alternate protocols. Accordingly, the scope and spirit of the invention should be judged in terms of the claims which follow.

What is claimed is:

1. A method comprising:
   retrieving one or more e-mail messages from an e-mail server on behalf of a user and temporarily storing said one or more e-mail messages in a short term message queue;
   identifying a wireless data processing device associated with said user;
   attempting to transmit said one or more e-mail messages to said wireless data processing device from said short term message queue; and
   copying said one or more e-mail messages from said short term message queue to a long term message queue if said attempt to transmit said one or more e-mail messages is unsuccessful after a predetermined period of time or number of attempts.

2. The method as in claim 1 wherein retrieving comprises:
   executing a mail agent to monitor said user's account on said e-mail server for new e-mail messages and, responsive to detecting a new e-mail message has arrived, said mail agent forwarding said new e-mail messages to said short term queue.

3. The method as in claim 1 further comprising:
   transferring said one or more e-mail messages from said long term queue to said short term queue responsive to detecting that said wireless data processing device is online; and
   reattempting to transmit said one or more e-mail messages to said user from said short term message queue.

4. The method as in claim 1 wherein identifying further comprises:
   performing a database query in a user database with a user's account identification code to identify a device identification code associated with said user's account.

5. The method as in claim 1 wherein said short term message queue is configured on a dispatcher server, said dispatcher server supporting a socket connection between said wireless data processing device and an e-mail proxy server, said e-mail proxy server performing said step of retrieving said one or more e-mail messages.

6. The method as in claim 1 further comprising:
initially determining whether said wireless data processing device is communicatively coupled to a wireless network prior to retrieving said one or more e-mail messages.

7. The method as in claim 6 wherein determining comprises querying a user database in which an online/offline status of said data processing device is stored.

8. A system for distributing electronic messages to a wireless data processing device comprising:
a dispatcher to maintain a communication channel with said wireless data processing device, said dispatcher comprising a short term message queue for temporarily storing e-mail messages addressed to said wireless data processing device while said dispatcher attempts to transmit said e-mail messages to said wireless data processing device; and
a long term message queue for receiving said e-mail messages from said dispatcher if said dispatcher is unable to deliver said e-mail messages to said wireless data processing device after a specified period of time or a specified number of attempts, said long term storage queue to store said e-mail messages until a dispatcher establishes another communication channel with said wireless data processing device.

9. The system as in claim 8 wherein said long term storage queue is comprised of a pending message table within a user database.

10. The system as in claim 9 wherein said pending message table stores new e-mail message alerts in addition to said e-mail messages, said new e-mail message alerts indicating that new e-mail messages are available on a particular e-mail server.

11. The system as in claim 8 further comprising:
an e-mail proxy for retrieving said e-mail messages from a specified e-mail server on behalf of a user and transmitting said e-mail messages to said dispatcher.

12. The system as in claim 11 further comprising:
a mail agent to indicate to said proxy server when new e-mail messages have arrived at said e-mail server.

13. The system as in claim 12 wherein, responsive to said indication of new e-mail messages, said e-mail proxy checks a user status database to determine whether a communication channel is currently established between said wireless data processing device and said dispatcher, and, if so, wherein said proxy server transmits said indication of new e-mail messages to said wireless data processing device.

14. The system as in claim 13 wherein, if a communication channel is not currently established between said wireless data processing device and said dispatcher, said proxy server transmits said indication of new e-mail messages to said long term storage queue.

15. The system as in claim 14 wherein, when said wireless data processing device reestablishes a communication channel with a dispatcher, said dispatcher checks said long term storage queue for any pending messages and responsively transmits said indication of new e-mail messages to said wireless data processing device.

16. The system as in claim 15 wherein, upon receiving said indication of new e-mail messages, said wireless data processing device requests all new e-mail messages from said proxy server.

17. The system as in claim 16 wherein said request for all new e-mail messages comprises a request for all e-mail messages having an identification code greater than e-mail messages stored on said wireless data processing device.

18. A system comprising:
e-mail message retrieval means for retrieving one or more e-mail messages from an e-mail server on behalf of a user and temporarily storing said one or more e-mail messages in a short term message queue;
device identification means for identifying a wireless data processing device associated with said user;
first queuing means for initially queuing said e-mail messages while attempting to transmit said e-mail messages to said wireless data processing device from said short term message queue; and
second queuing means to store said e-mail messages said attempt to transmit said one or more e-mail messages by said first queuing means is unsuccessful after a predetermined period of time or number of attempts.

19. The system as in claim 18 wherein said e-mail message retrieval means comprises:
mail agent means to monitor said user's account on said e-mail server for new e-mail messages and, responsive to detecting a new e-mail message has arrived, said mail agent forwarding said new e-mail messages to said short term queue.

20. The system as in claim 18 wherein said second queuing means transfers said one or more e-mail messages back to said first queuing means responsive to detecting that said wireless data processing device is online; said first queuing means then reattempting to transmit said one or more e-mail messages to said user.

21. The system as in claim 18 wherein said device identification means performs a query in a user database with a user's account identification code to identify a device identification code associated with said user's account.

22. The system as in claim 18 wherein said first queuing means comprises a dispatcher server, said dispatcher server supporting a socket connection between said wireless data processing device and said retrieval means.

23. The system as in claim 18 further comprising:
device status identification means for initially determining whether said wireless data processing device is communicatively coupled to a wireless network prior to said e-mail message retrieval means retrieving said one or more e-mail messages.

24. The system as in claim 23 wherein said device status identification means comprises a user database in which an online/offline status of said data processing device is maintained.

* * * * *